US010705266B2

(12) United States Patent
Wang et al.

(10) Patent No.: US 10,705,266 B2
(45) Date of Patent: Jul. 7, 2020

(54) OPTICAL DIFFUSING FILM LAMINATE AND METHOD OF MAKING

(71) Applicant: 3M INNOVATIVE PROPERTIES COMPANY, St. Paul, MN (US)

(72) Inventors: Qingbing Wang, Woodbury, MN (US); Encai Hao, Woodbury, MN (US); Tri D. Pham, Woodbury, MN (US); Daniel J. Theis, Mahtomedi, MN (US); Matthew S. Stay, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 245 days.

(21) Appl. No.: 15/749,580

(22) PCT Filed: Aug. 5, 2016

(86) PCT No.: PCT/US2016/045879
§ 371 (c)(1),
(2) Date: Feb. 1, 2018

(87) PCT Pub. No.: WO2017/024265
PCT Pub. Date: Feb. 9, 2017

(65) Prior Publication Data
US 2018/0224582 A1 Aug. 9, 2018

Related U.S. Application Data

(60) Provisional application No. 62/201,422, filed on Aug. 5, 2015.

(51) Int. Cl.
*G02B 5/02* (2006.01)
*G02B 5/04* (2006.01)

(52) U.S. Cl.
CPC ......... *G02B 5/0268* (2013.01); *G02B 5/0226* (2013.01); *G02B 5/0242* (2013.01); *G02B 5/0247* (2013.01); *G02B 5/0278* (2013.01); *G02B 5/045* (2013.01); *G02B 5/0236* (2013.01)

(58) Field of Classification Search
None
See application file for complete search history.

(56) References Cited

U.S. PATENT DOCUMENTS

| 6,846,089 B2 | 1/2005 | Stevenson et al. |
| 7,236,217 B2 | 6/2007 | Kotchick et al. |
| 7,339,635 B2 | 3/2008 | Freking et al. |

(Continued)

FOREIGN PATENT DOCUMENTS

| KR | 10-2008-0040316 | 5/2008 |
| WO | 2014/123836 | 8/2014 |
| WO | 2017/139611 | 8/2017 |

*Primary Examiner* — Derek S. Chapel

(57) ABSTRACT

An optical film assembly comprising a first optical film, a coupling member, and a second optical film wherein the first optical film comprises a prismatic film, the second optical film comprises a diffuser, wherein the coupling member is bonded to the first optical film and to the second optical film such that the first optical film and second optical film are physically coupled, and the coupling member is bonded to at least one of the first optical film and the second optical film non-continuously such that an optically effective air gap is provided. Also, a method for making such optical film assemblies.

22 Claims, 2 Drawing Sheets

(56) References Cited

U.S. PATENT DOCUMENTS

| | | |
|---|---|---|
| 7,413,336 B2 | 8/2008 | Freking et al. |
| 7,520,654 B2 | 4/2009 | Freking et al. |
| 8,808,811 B2 | 8/2014 | Kolb et al. |
| 8,848,132 B2 | 9/2014 | O'Neill et al. |
| 8,942,522 B2 | 1/2015 | Edmonds et al. |
| 8,964,146 B2 | 2/2015 | Hao et al. |
| 9,229,141 B2 * | 1/2016 | Boyd .................. G02B 5/0231 |
| 9,279,918 B2 | 3/2016 | Haag et al. |
| 9,291,752 B2 | 3/2016 | Coggio et al. |
| 2007/0189038 A1 | 8/2007 | Pokorny et al. |
| 2007/0203267 A1 * | 8/2007 | Richard ............ G02F 1/133606 524/47 |
| 2009/0256993 A1 | 10/2009 | Oku |
| 2012/0038990 A1 | 2/2012 | Hao et al. |
| 2012/0200931 A1 * | 8/2012 | Haag .................... G02B 5/0247 359/599 |
| 2014/0168766 A1 * | 6/2014 | Boyd .................. G02B 5/0231 359/485.01 |
| 2014/0340911 A1 | 11/2014 | Woo et al. |
| 2015/0043074 A1 | 2/2015 | Patel et al. |
| 2015/0140316 A1 | 5/2015 | Steiner et al. |
| 2015/0293272 A1 | 10/2015 | Pham et al. |
| 2016/0164031 A1 | 6/2016 | Pieper et al. |
| 2017/0248742 A1 * | 8/2017 | Nirmal ................. G02B 5/0215 |

* cited by examiner

OPTICAL DIFFUSING FILM LAMINATE AND METHOD OF MAKING

CROSS REFERENCE TO RELATED APPLICATIONS

This application is a national stage filing under 35 U.S.C. 371 of PCT/US2016/045879, filed Aug. 5, 2016, which claims the benefit of U.S. Provisional Application No. 62/201,422, filed Aug. 5, 2015, the disclosure of which is incorporated by reference in its/their entirety herein.

FIELD

This invention relates to new constructions for unitary optical film assemblies, in particular assemblies with a prismatic film and a diffuser film, with improved bond strength, cosmetic appearance, and uniformity of desired optical properties and methods of their manufacture.

BACKGROUND

Optical displays, such as backlit liquid crystal displays ("LCDs"), are used in a wide variety of device applications including mobile telephones, personal digital assistants ("PDAs"), electronic games, laptop computers, monitors, and television screens. Optical films are stacked within an optical display in order to enhance brightness and improve display performance without sacrificing battery life. Ideally, optical films are stacked in such a manner that an air gap is maintained between adjacent films to optimize optical performance.

Presently, films used in displays are often provided as individual films to display manufacturers. The films typically include tabs that are useful in orienting and positioning the films, and cover sheets to protect the surfaces of the films. During assembly of a display, the cover sheets of the films are removed, and the films are stacked, one by one, for instance, into a frame that fits between a backlight assembly and an LCD panel. Double-coated rim tape is placed over the stacked films, which seals the edges of the films. A cover sheet is then placed over the rim tape. To finish the display, the cover sheet is removed, and the LCD panel is adhered to the rim tape.

This process is difficult and costly in terms of time and material. Creating tabs on the films increases the amount of waste material that is produced and increases the width of the bezel, or edge, that must extend around the perimeter of the display to cover the tab. Because the tabs extend to the edge of the rim tape, a path is created that allows debris to enter and settle between the films. Removing cover sheets from individual films increases assembly time and the possibility of damaging the films. In addition, as optical films are made in ever thinner variants, it becomes increasingly difficult to handle an individual optical film, by hand or machine. Thus, resolving these problems would increase product output by increasing assembly efficiency and reducing the number of damaged films.

U.S. Pat. No. 7,339,635 (Freking et al.) discloses an approach whereby optical films are stacked and arranged in sub-assemblies to reduce the handling of individual layers in subsequent device manufacturing operations.

The need exists for alternative constructions of, and methods for making, unitary optical film assemblies of prismatic and diffuser films.

SUMMARY

This invention provides novel constructions of unitary optical film assemblies of prismatic optical films and diffuser optical films which are bonded together in unitary optical assemblies which are physically coupled in mechanically robust configuration while minimizing the degree to which they are optically coupled. Methods for manufacture such assemblies are also provided.

Ideally, optical films are stacked in such a manner that a gap (typically merely air space referred to as an "air gap") is maintained between adjacent films to optimize optical performance. A typical optical film material has a refractive index of about 1.5. When there is an air gap in between adjacent optical films, light traveling at angles larger than total internal reflection angles (TIR angles) is trapped within each optical film. Such configurations are sometimes described as being "optically decoupled" and desired optical performance is obtained. When the gap between two optical films is filled by a third optical material, for example an optical clear adhesive, the desired total internal reflection interfaces of the optical films are compromised, light at high angles will travel from one optical film to the other, thereby degrading resultant optical performance. The two optical films in such a situation are sometimes referred to as being "optically coupled".

In brief summary, an optical film assembly of the invention comprises a first optical film, a coupling member, and a second optical film. The first optical film comprises a prismatic film and has a first major face from which optical elements protrude and an opposing second major face. The second optical film comprises a diffuser and has a first major face and an opposing second major face. The coupling member is bonded to the second major face of the first optical film and to first major face of the second optical film such that the first optical film and second optical film are physically coupled while remaining substantially optically decoupled. In accordance with the invention, the coupling member is bonded to at least one of the first optical film and the second optical film non-continuously such that an optically effective air gap is provided.

Briefly, the method of the invention comprises:

providing (1) a first optical film as described herein, (2) a second optical film as described herein; and (3) a coupling composition as described herein; then contacting the coupling composition to both the first optical film and the second optical film such that the coupling composition has non-continuous contact with at least one of the first optical film and the second optical film such that the first optical film and second optical film are physically coupled while remaining substantially optically decoupled and an optically effective air gap is provided; and causing the coupling composition to bond to the first optical film and the second optical film: to yield the optical film assembly.

The present invention provides novel constructions or film assemblies with several surprising advantages and methods for making them. With the invention, numerous forms of optical stacks and devices comprising optical films can be fabricated more efficiently, and if desired, using ever thinner constituent optical films. Resultant optical stacks can offer heretofore unattained combinations of performance such as high optical gain coupled with robust mechanical durability.

BRIEF DESCRIPTION OF THE DRAWINGS

The invention is further explained with reference to the drawing wherein.

These figures are not to scale and are intended to be merely illustrative and not limiting. Like reference numbers are used to refer to analogous features.

DETAILED DESCRIPTION OF ILLUSTRATIVE EMBODIMENTS

Optical Film Assembly

Figure 1:
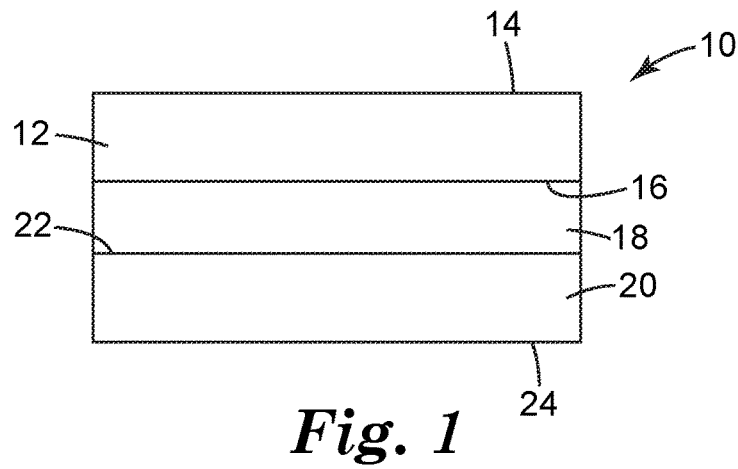
FIG. 1 is a schematic illustration of a cross-section of an optical film assembly of the prior art.

FIG. 1 is a schematic illustration of a cross-section of an optical film assembly of the prior art. Optical film assembly 10 comprises first optical film 12 having first major face 14 and second major face 16, coupling member 18, and second optical film 20 having first major face 22 and second major face 24. The coupling member is bonded substantially continuously to both the second major face of the first optical film and the first major face of the second optical film. In this assembly, the first optical film and second optical film are optically coupled.

A critical feature of the invention is that the coupling member is bonded to at least one of the first optical film and the second optical film non-continuously such that an optically effective air gap is provided. The invention provides novel assemblies in which the optical films are physically coupled so as to impart desired mechanical properties and benefits while minimizing the degree of optical coupling such that desired optical properties are maximized. In some embodiments, the coupling member is bonded non-continuously to the first optical film, in some embodiments the coupling member is bonded non-continuously to the second optical film, and in some embodiments the coupling member is bonded non-continuously to both the first optical film and the second optical film.

Figure 2:
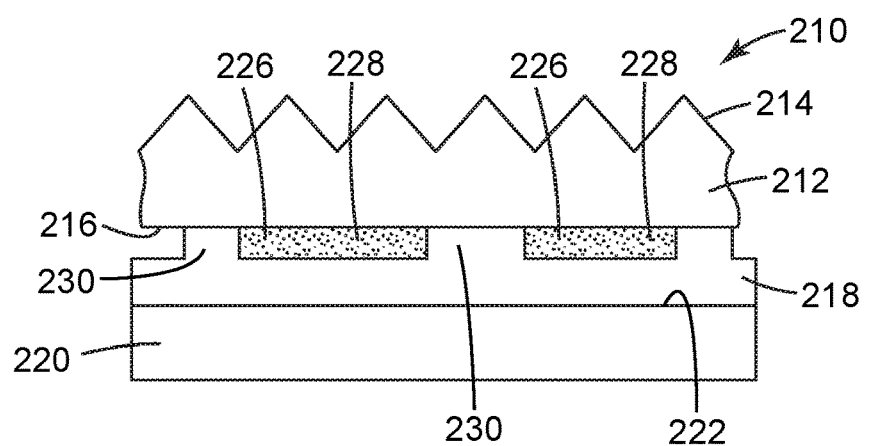
FIG. 2 is a cross-section of an illustrative embodiment of an optical film assembly of the invention.

FIG. 2 is a cross-section of an illustrative embodiment of an optical film assembly 210 of the invention comprising first optical film 212 having first major face 214 and second major surface 216, coupling member 218, and second optical film 220 having first major surface 222 where coupling member 218 is bonded non-continuously to second major face 216 of first optical film 212 and is bonded substantially continuously to first major face 222 of second optical film 220. In this embodiment, assembly 210 further comprises deposit 226 of a passivating agent which ensures that coupling member 218 is bonded to second major face 216 of first optical film 212 discontinuously, thereby achieving the desired air interface or air gap (optically decoupled arrangement) for desired optical performance.

Figure 3:
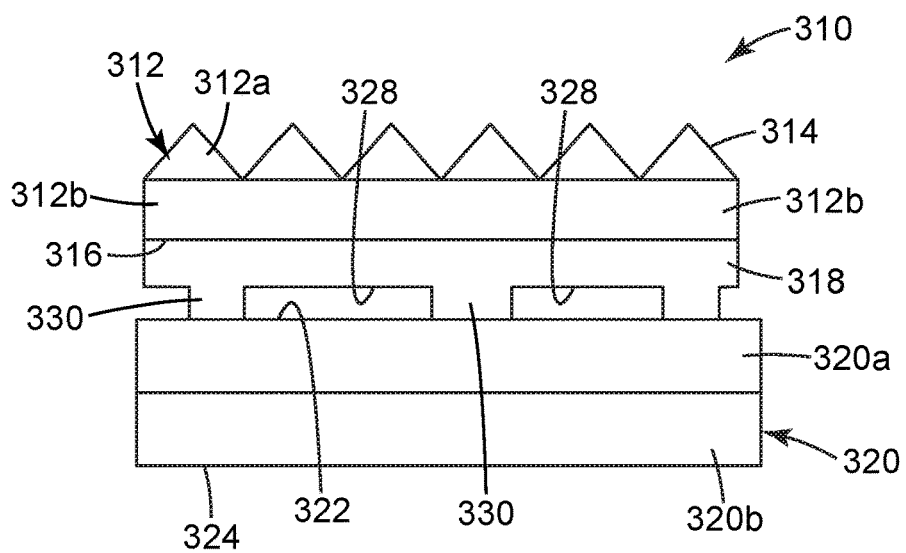
FIG. 3 is a cross-section of another illustrative embodiment of an optical film assembly of the invention.

FIG. 3 is a cross-section of an illustrative embodiment of an optical film assembly 310 of the invention comprising first optical film 312 having first major surface 314 and second major surface 316, coupling member 318, and second optical film 320 having first major surface 322 and second major surface 324 where coupling member 318 is bonded substantially continuously to second major face 316 of first optical film 312 and is bonded non-continuously to first major face 322 of second optical film 320. In the embodiment shown in FIG. 3, first optical film 312 is a multilayer film comprising elements layer 312a and base layer 312b, and second optical film 320 is a multilayer film comprising layer 320a and layer 320b.

Figure 4:
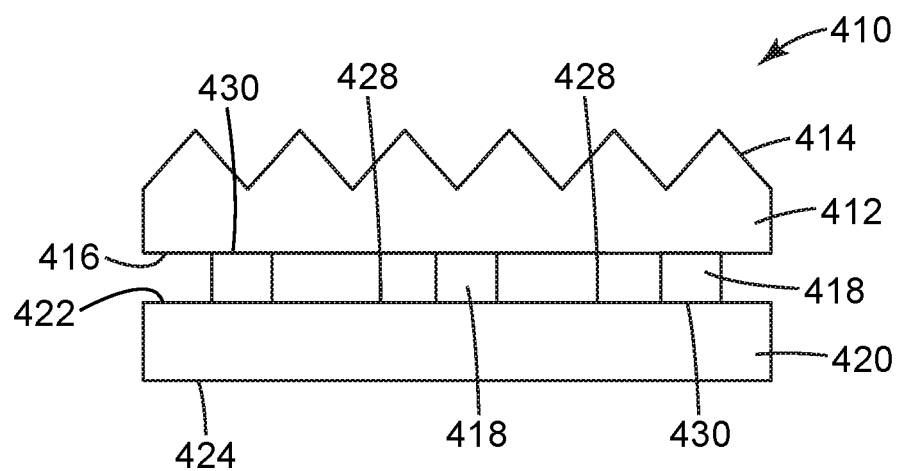
FIG. 4 is a cross-section of another illustrative embodiment of an optical film assembly of the invention.

FIG. 4 is a cross-section of an illustrative embodiment of an optical film assembly 410 of the invention comprising first optical film 412 having first major surface 414 and second major surface 416, coupling member 418, and second optical film 420 having first major surface 422 and second major surface 424, where coupling member 418 is bonded non-continuously to second major face 416 of first optical film 412 and is bonded non-continuously to first major face 422 of second optical film 420.

At some portions of this description, reference is made to x, y, and z axes. The x, y, and z axes are mutually perpendicular. The x, and y axes correspond to the geometric plan defined by a sheet such as an optical film in its flat configuration while the z axis corresponds to the vertical dimension from one film to another (e.g., vertically in FIG. 1).

First Optical Film

The first optical film can be a light transmissive prismatic film. The prismatic film has a first major face from which a plurality of optical elements protrudes (i.e., an array of surfaces with selected geometry). The prismatic film has a second major face opposing the film's first major face. In assemblies of the invention, the film's second major face is oriented toward the second optical film with the coupling member located in between.

In some embodiments the first optical film is of monolayer construction (e.g., such as is depicted in FIGS. 2 and 4). In some embodiments, the first optical film is of multilayer construction (e.g., such as is depicted in FIG. 3).

A variety of prismatic films may be used in optical film assemblies of the present invention. Illustrative examples include examples include 3M™ TBEF-DT and 3M™ TBEF2-DT. Other alternatives will be readily apparent to those skilled in the art.

Second Optical Film

The second optical film is a light transmissive diffuser.

Diffusers suitable for use in the present invention include both optically random and non-random diffusers. Diffusers used herein may be bead-based diffusers; diffusers used herein may be microreplicated. In some embodiments, the diffuser may be a QDEF type optical film. A Quantum Dot Enhancement Film, or "QDEF", is a film bearing particulate "quantum dots" which absorb specific light wavelengths (colors) emitted from an LED or other light source, and re-emit at different wavelengths, including some that may be missing from the emission of the light source itself, thus serving to enhance its spectrum. A QDEF film absorbs light from one or a few discrete sources, and re-emits from a multiplicity of dots, thus it also serves as a diffuser.

In some embodiments the second optical film is of monolayer construction (e.g., such as is depicted in FIGS. 2 and 4). In some embodiments, the second optical film is of multilayer construction (e.g., such as is depicted in FIG. 3).

A variety of diffusers may be used in optical film assemblies of the present invention. Illustrative examples of well-known commercially available diffusers suitable for use herein include 3M™ UDF (i.e., "Ultra Diffuser Film"), and 3M™ QDEF (i.e., "Quantum Dot Enhancement Film"). Illustrative examples of diffusers that could be used in the invention are disclosed in US Patent Appln. Publn. No. 2015/0293272 (Pham et al.), US Patent Appln. Publn. No. 2016/0164031 (Pieper et al.), and WO 2014/123836 (Benoit et al.). Other alternatives will be readily apparent to those skilled in the art.

In some embodiments, the first major face of the diffuser film may have a coating or surface element provided thereon to present a surface more suitable for bonding to the coupling member, to optimize optical performance, etc.

For instance, in some embodiments, an Ultra Low refractive Index ("ULI") coating is incorporated in the second optical film to constitute the first major face of the second optical film (i.e., the side oriented toward the coupling member and prismatic film. The use of a ULI layer provides an index difference between optical layers that is intermediate between having an air layer (as in a spaced apart two film construction) and having direct optical contact between the adhesive and each of the two optical films. Thus, the use of a ULI layer may enhance brightness gain (also called optical gain), compared to direct bonding of two optical films with adhesive without the ULI layer.

For instance, a layer of ULI having, e.g., an index of refraction of about 1.18, may be applied upon a diffuser layer (e.g., having an index of refraction of about 1.50). Illustrative examples of suitable ULI embodiments are disclosed in US Patent Appln. Publn. No. 2012/0038990 (Hao et al.); U.S. Pat. No. 9,291,752 (Coggio et al.) which discloses fumed silica based materials; and U.S. Pat. No. 8,808,811 (Kolb et al.) and U.S. Pat. No. 9,279,918 (Haag et al.) which disclose gel type materials. A ULI coating is a polymeric solid network or matrix having a structure of nanometer sized pores or voids. The dimensions of the pores or voids in a ULI coating can generally be described as having an average effective diameter that can range from about few nanometer to several hundred of nanometers. ULI coatings typically have effective refractive indices less than 1.2, and may be useful for various applications based on optical, physical, or mechanical properties provided by their nano-voided composition.

Coupling Member

The coupling member is bonded to both the first optical film and to the second optical film, forming an integral unitary optical film assembly of the invention. The physical coupling of the two optical films permits the assembly to be handled and converted more conveniently, thereby providing significantly increased convenience and ease of use.

In some embodiments, the coupling member is bonded to the first optical film non-continuously and to the second optical film continuously (e.g., as shown in FIG. 2). In some embodiments, the coupling member is bonded to the first optical film continuously and to the second optical film non-continuously (e.g., as shown in FIG. 3). In some embodiments, the coupling member is bonded to both the first optical film and the second optical film non-continuously (e.g., as shown in FIG. 4).

The coupling member may comprise a light transparent, preferably optically clear adhesive ("OCA").

The coupling member comprises a material that is suitable for processing as described herein as well as suitable for developing a desirable bond with each of the adherends (i.e., the second major face of the first optical film and the first major face of the second optical film). In addition, the coupling member should be a material that is stable, preferably not subject to undesired change in color or light transmission, undesired change in dimensional configuration or other loss of mechanical properties, etc.

Some illustrative examples of materials for use in the coupling member include optical adhesives which are acrylate based or urethane based. Those skilled in the art will be able to readily select suitable materials for use in the coupling member in accordance with the invention.

With reference to FIG. 2, coupling member 218 is bonded to first optical film 212 at portions 230, but not at portions 228. In the aggregate, the combination of portions 230 and 228 is a non-continuous bond. The portions of optical film 212 bonded to coupling member portions 230 which are an essential component of the desired physical coupling of optical films 212 and 220 of assembly 210, but the assembly is subject to reduced optical performance due to optical coupling. However, the portions of optical film 212 facing coupling member portions 228 are optically decoupled. Similarly, portions 330 of assembly 310 in FIG. 3 provide desired physical coupling while the air gap interfaces at portions 328. In the embodiment shown in FIG. 4, coupling member 418 is non-continuous in the x-y plane, leaving gaps 428 between optical films 412 and 420 so as to provide the desired optically decoupled condition.

In accordance with the invention, the coupling member is bonded only non-continuously to at least one, and in some embodiments to each, optical film. In some embodiments, light-diffusing particles such as polymeric (e.g., polymethyl methacrylate), glass, or silica particles or beads may be incorporated in the matrix of the coupling member to reduce the relative light scattering contrast between the portions of the coupling member which are in bonded contact with an optical film and the adjacent portions of the coupling member which are not in contact with the film. It is typically preferred that such particles be less than about 1.5 microns in diameter.

In some embodiments, the coupling member is preferably from about 1 to about 3 microns in thickness (i.e., the z dimension). In other embodiments, coupling members having thicknesses outside this range may be used.

Method of Manufacture

Briefly, the method of the invention comprises:

providing (1) a first optical film as described herein, (2) a second optical film as described herein; and (3) a coupling composition as described herein;

contacting the coupling composition to both the first optical film and the second optical film such that the coupling composition has non-continuous contact with at least one of the first optical film and the second optical film such that the first optical film and second optical film are physically coupled while providing an optically effective air gap so as to minimize the degree of optical coupling; and causing the coupling composition to bond to the first optical film and the second optical film: to yield the optical film assembly.

As discussed above, the coupling composition can be a light transmissive, preferably optically clear adhesive.

In some embodiments, the coupling composition achieves bond with the respective adherends (i.e., the second major face of the first optical film and the first major face of the second optical film) merely through contact. In other words, the coupling composition acts as a pressure sensitive adhesive and causing the coupling composition to bond to the adherends consists essentially of bringing it into contact with each adherend under pressure.

In some embodiments, causing the coupling composition to bond to the adherends comprises activating it, in addition to contacting it to the two adherends. For instance, actinic radiation (e.g., e-beam, UV radiation), heat, or other means may be applied to cause the coupling composition to cure to achieve or enhance the desired bonds thereby yielding the coupling member and resultant optical film assembly.

As described above, the coupling member is bonded non-continuously to at least one of the first optical film or the second optical film. By non-continuous is meant that when a unit portion of the assembly is considered in the x-y plane, in some portions of the unit portion the coupling member is in contact with and bonded to the optical film and in other portions of the unit portion it is not.

In some embodiments this non-continuous contact is achieved by applying the coupling composition in discontinuous fashion such as by depositing discrete, unconnected segments of coupling composition (e.g., dots, lines, etc.) on at least a portion of one of the constituent optical films. The coupling composition can be applied by any conventional method, including any conventional printing method. Illustrative examples include flexography, gravure printing, screen printing, and ink-jet printing. The elements of the incomplete layer (dots, lines, etc.) may be present in any regular pattern or may be present in a random pattern.

In some embodiments, the non-continuous contact is achieved by forming the coupling member in the form of a continuous layer (e.g., with substantially uniform thickness in the z axis), then selectively passivating portions of a major face of it before contacting that major face to one of the optical films. The passivated portions tend to minimize or even eliminate wetting out of the coupling member to the optical film while the non-passivated portions wet out and develop desired bonds to the optical film. The result is the desired non-continuous bond of the coupling member to the optical film, with the passivated portions providing desired air interfaces. In illustrative way to manufacture such coupling members is to form a layer of the coupling composition (e.g., on a transfer liner or an optical film) such that a major face of it is exposed, apply a passivating agent to select portions of the exposed major face, activate the passivating agent if necessary, then contact (e.g., via lamination) the other optical film to the exposed, selectively passivated, major face, and then bond together. Those skilled in the art will be able to readily select suitable methods for applying a passivating agent in desired manner. Illustrative methods include flexography, gravure printing, screen printing, and ink-jet printing.

Figure 5:
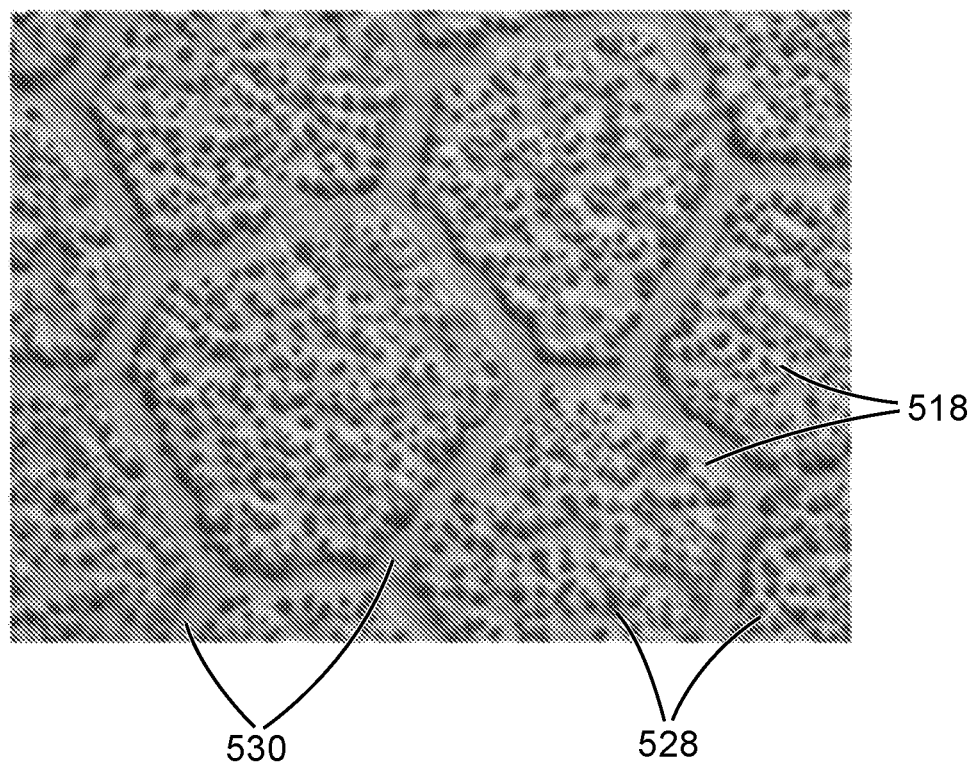
FIG. 5 is a photomicrograph of showing in plan view of the surface of a coupling member after application of a passivating agent thereto.

FIG. 5 is a photomicrograph of such an embodiment showing a plan view of the surface of a coupling member after application of a passivating agent thereto. In FIG. 5, the major face of coupling member 518 has a plurality of passivated portions 528 (which correspond to coupling member portions 228 in assembly 210 shown in FIG. 2) and non-passivated portions 530 (which correspond to coupling member portions 230 in assembly 210 shown in FIG. 2). The non-passivating portions intersect to define the passivated portions as closed cells.

In some embodiments, the passivating agent comprises a coating material (e.g., UV curable ink or other material capable of forming a hard coat on the surface of the coupling member so as to interfere with the capability of the affected portion of the coupling member to wet out and bond to the optical film) or dusting agent (e.g., particles which interfere with the capability of the affected portion of the coupling member to wet out and bond to the optical film). In some instances, particles may be incorporated into a curable fluid or ink. In some illustrative embodiments, the particle are about 2 to about 3 microns in diameter or largest dimension, although particles outside this range may be used in accordance with the invention. The particles may be regular or irregular in shape as desired. Typically the average dimension of the particles is at least as large, or larger than, the final thickness of the coating. As such the particles more effectively maintain an effective air gap within the passivated portion.

The dimensions and shape of the passivated portions and the non-passivated portions may be selected as desired. Relatively larger percent of area (i.e., in the x-y plane) which is passivated will yield a resultant unitary optical film assembly with relatively higher optical performance, while relatively larger percent of area which is non-passivated will yield a resultant unitary optical film assembly with relatively greater mechanical robustness.

In some embodiments, the passivated portions and non-passivated portions may be of any desired shape and arrangement. It is typically preferred that the non-passivated portions be interconnected so as to form closed cell passivated portions in which the desired air interfaces are separated from one another.

Resultant brightness gain and bonding strength are dependent in part upon the proportion of the surface area which is adhesive covered. With or without a ULI layer, the air gaps which result from the incomplete nature of the adhesive layer in this embodiment contribute to an increase in the resultant brightness gain compared to that a complete layer of OCA in an otherwise identical construction.

In many instances, application of a passivation overcoat in desired shape(s) and proportions can be more readily controlled as desired than can application of an incomplete layer of the adhesive as in the earlier-recited embodiment. This can facilitate construction of integrated stacks with greater resolution as to the passivated (i.e., non-wetting) areas. If desired, beads or similar components may be used in the passivated zones to attain a true air gap between the diffuser and prism films. FIG. 5 is a photomicrograph of an illustrative embodiment.

In typical uses, an air gap is necessary between a prism film and a bottom diffuser. If prism film and diffuser are fully laminated to each other, the brightness gain will be dramatically reduced as high angle light can couple into the prism film, resulting in poor collimation and lower brightness.

EXAMPLES

The invention is further explained with the following illustrative, non-limiting examples.

Examples 1-4

Several illustrative optical film stacks were prepared, brightness gain was measured, and the results are presented in Table 1. Comparative Example C1 was illustrative of the traditional two-film approach, in which a Thin Brightness Enhancement Film, or "TBEF" (3M Company, St. Paul, Minn.) was simply positions atop an Ultra Diffuser Film, or "UDF" (3M Company, St. Paul, Minn.) with no adhesive whatsoever (i.e., they are mutually supported at their edges in a chassis or frame), leaving a natural air gap between the two optical films. Comparative Example C2 was illustrative of the use of an OCA to bond the two optical films into a unitary stack with the adhesive forming a substantially continuous bond to each of the optical films. As shown in the results, In Comparative Example C2 there was a significant decrease in brightness gain as compared to Example C1, resulting from elimination of the optically beneficial air interface. Comparative Example C3 was illustrative of overcoating UDF with a ULI layer in a conventional (two-film) stack (i.e., they were mutually supported at their edges in a chassis or frame), leaving a natural air gap between the two optical films. The films were mounted in the frame such that the ULI coated side of the UDF faced toward the TBEF. As shown in the results, the relative decrease in gain as compared to Comparative Example C1 was slight.

Example 4 was illustrative of the embodiment of the first schematic illustration, above, in which a ULI-overcoated UDF was bonded to a TBEF using an Optically Clear Adhesive, or "OCA" (3M Company, St. Paul, Minn.) in which the OCA was bonded non-continuously to the TBEF. As shown in Table 1, the effective brightness gain is decreased somewhat as compared to Comparative Example C1, but it was much higher than that of Comparative Example C2 while also attaining the desired mechanical benefits of a unitary optical film assembly.

TABLE 1

Optical performance

| Example | Optical Film Stacks* | Brightness Gain (Avg.) |
|---|---|---|
| C1 | TBEF – Air – UDF | 1.896 |
| C2 | TBEF/OCA/UDF | 1.0985 |
| C3 | TBEF – Air – ULI/UDF | 1.864 |
| 4 | TBEF + OCA/ULI/UDF | 1.621 |

*"–" denotes the adjacent members are merely positioned relative to one another in the indicated order;
"/" denotes the adjacent members are bonded in substantially continuous direct contact;
"+" denotes the adjacent members are bonded non-continuously.

Examples 5-7

Materials: The following materials were used:
Isobornyl acrylate, from Sartomer, Exton, Pa., under tradename SR506A;
Alkoxylated tetrahydrofurfuryl acrylate, from Sartomer Exton, Pa., under tradename SR611;
Polyurethane acrylate, from Sartomer Exton, Pa., under tradename CN9018;
Photoinitiator, IRGACURE® TPO from BASF Corporation, Wyandotte, Mich.; and
5 micron mono-dispersed PMMA beads, from Soken Chemical America Inc., Fayetteville, Ga., under tradename MX-500.

Preparation of UV-curable liquid adhesive: In a brown glass jar, 400 g of SR506A, 250 g of SR611, 350 g of CN9018, and 10 g of Irgacure® TPO were mixed together. The jar was placed on a jar roller overnight to form a homogenous liquid adhesive solution. To this solution, 87 g of MX-500 was added and dispersed under rapid stirring to ensure a good dispersion of beads without aggregation.

Printing Process: Passivating coatings were printed via the following process. A roll-to-roll flexographic printing apparatus was used to transfer passivating composition to an anilox roller and then to a soft roller printing plate with elastomeric raised image elements which then applied the passivating composition to a layer of adhesive. The printing equipment used in the experiment was a commercially available printing press from Retroflex Inc., Wrightstown, Wis. A peristaltic pump, model 323S/D2 from Watson-Marlow, Wilmington, Mass., was used to dispense fluid into enclosed applicator. The anilox rolls were 4 BCM (billion cubic microns per square inch), and 8 BCM, 165 lpi (lines per inch) from Interflex, Spartanburg, S.C. The flexographic mounting tape was E1120H from 3M Company, St. Paul, Minn.). A 0.067 inch DPR-Nitro flexographic printing plate from SGS International, Brooklyn Park, Minn. was used.

The printing of the patterned adhesive was performed at 20 fpm (feet per minute). After pattering of the adhesive the film was transported on the print line to the curing section of the line and a "wet lamination" (top film laminated to the patterned adhesive side of the substrate before the patterned adhesive was exposed to curing) was performed just prior to the UV curing step.

The patterned UV-curable layers were irradiated with high intensity UV light in a nitrogen-purged atmosphere with a mercury arc lamp UV curing assembly from Xeric Web Drying Systems, Neenah, Wis. UV intensity measured during the curing at a run speed of 20 fpm was 0.552 W/cm$^2$ in the UVA wavelengths and 0.519 W/cm$^2$ in the UVB wavelengths. (UVA wavelengths refers to 315-400 nm and UVB wavelengths refers to 280-315 nm).

The laminated and cured film was then transported to the winding section of the printing press as a completed laminate to later be unwound and cut to the desired dimensions. Average Effective Transmission or "Gain" was measured. Table 2 contains results.

TABLE 2

Optical performance

| Examples | Optical Film Stacks | Passivating Agent | Average Effective Transmission |
|---|---|---|---|
| C5 | TBEF – Air – TBEF – Air – UDF | None | 2.2377 |
| 6 | TBEF – Air – TBEF + OCA/UDF | 6.5 BCM | 2.1505 |
| 7 | TBEF – Air – TBEF + OCA/UDF | 8 BCM | 2.1065 |

*"–" denotes the adjacent members are merely positioned relative to one another in the indicated order;
"/" denotes the adjacent members are bonded in substantially continuous direct contact;
"+" denotes the adjacent members are bonded non-continuously.

As seen in these results, the Effective Transmission performance of the stacks in Examples 6 and 7 was only reduced slightly from that provided in Comparative Example C5, but the unitary optical film subassemblies of Examples 6 and 7 offer significantly improved convenience over these traditional stack arrangement of Comparative Example C5.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An optical film assembly comprising a first optical film, a coupling member, and a second optical film wherein:
   the first optical film comprises a prismatic film and has a first major face from which a plurality of optical elements protrude and an opposing second major face;
   the second optical film comprises a diffuser and has a first major face and an opposing second major face, wherein the first major face of the second optical film comprises a ULI coating; and
   the coupling member is bonded to the second major face of the first optical film and to the first major face of the second optical film such that the first optical film and second optical film are physically coupled; and
   wherein the coupling member is bonded to at least one of the first optical film and the second optical film non-continuously such that an optically effective air gap is provided.

2. The assembly of claim 1 wherein the first optical film is a monolayer construction.

3. The assembly of claim 1 wherein the first optical film is a multilayer construction.

4. The assembly of claim 1 wherein the second optical film comprises a light diffusion film.

5. The assembly of claim 4 wherein the light diffusion film is selected from the group consisting of bead-based diffusers, microreplicated diffusers, and quantum dot enhancement film diffusers.

6. The assembly of claim 1 wherein the coupling member is bonded to the first optical film non-continuously.

7. The assembly of claim 6 wherein the coupling member is substantially continuous.

8. The assembly of claim 1 wherein the coupling member is bonded to the second optical film non-continuously.

9. The assembly of claim 8 wherein the coupling member is substantially continuous.

10. The assembly of claim 1 wherein the coupling member is bonded to both the first optical film and to the second optical film non-continuously.

11. The assembly of claim 1 wherein the coupling member comprises adhesive.

12. The assembly of claim 11 wherein the adhesive is cured.

13. A method for making an optical film assembly of claim 1 comprising:
providing (1) a first optical film that comprises a prismatic film and has a first major face from which a plurality of optical elements protrude and an opposing second major face, (2) a second optical film that comprises a diffuser and has a first major face and an opposing second major face; and (3) a coupling composition, wherein the first major face of the second optical film comprises a ULI coating;
contacting the coupling composition to both the first optical film and the second optical film such that the coupling composition has non-continuous contact with at least one of the first optical film and the second optical film such that the first optical film and second optical film are in physical contact yet an optically effective air gap is provided; and
causing the coupling composition to bond to the first optical film and the second optical film such that it forms a coupling member so as to yield an optical film assembly wherein the coupling member is bonded to the second major face of the first optical film and to the first major face of the second optical film such that the first optical film and second optical film are physically coupled.

14. The method of claim 13 wherein causing the coupling composition to bond to the first optical film and the second optical film comprises bringing the coupling composition into contact with the adherends.

15. The method of claim 13 wherein causing the coupling composition to bond to the first optical film and the second optical film consists essentially of bringing the coupling composition into contact with the adherends.

16. The method of claim 13 wherein causing the coupling composition to bond to the first optical film and the second optical film comprises curing the coupling composition to raise the strength of the bond to the adherends.

17. The method of claim 13 further comprising, after contacting the coupling composition to one of the first optical film or the second optical film, selectively applying a passivation overcoat to a portion of the coupling composition before that face of the coupling composition layer is contacted to the other optical film.

18. The method of claim 13 further comprising priming at least one of the second major face of the first optical film and the first major face of the second optical film before the coupling composition is contacted thereto.

19. The method of claim 13 comprising:
forming the coupling composition into desired configuration; and then
contacting the coupling composition to one of the first optical film or the second optical film; and then
contacting the coupling composition to the other of the first optical film or the second optical film.

20. The method of claim 19 wherein forming the coupling composition into desired configuration comprises depositing the coupling composition in selective fashion.

21. The method of claim 13 comprising selectively passivating a portion of the coupling composition before contacting it to at least one of the first optical film or the second optical film such that the coupling composition will only wet out and bond non-continuously to the one of the first optical film or the second optical film.

22. The method of claim 21 wherein selectively passivating the coupling composition comprises applying a passivating agent to the surface of the coupling composition.

* * * * *